United States Patent [19]
Dorn

[11] Patent Number: 5,380,561
[45] Date of Patent: Jan. 10, 1995

[54] METHOD AND APPARATUS FOR COATING FLAT TEXTILE BODIES, ESPECIALLY CARPET PANELS

[75] Inventor: Michael Dorn, Frick, Switzerland

[73] Assignee: Textilma AG, Hergiswil, Switzerland

[21] Appl. No.: 112,700

[22] Filed: Aug. 26, 1993

[30] Foreign Application Priority Data

Aug. 28, 1992 [CH] Switzerland .................. 02683/92

[51] Int. Cl.6 .............................................. B05D 1/18
[52] U.S. Cl. .................... 427/430.1; 427/180; 427/206; 427/389.9; 427/394; 156/72
[58] Field of Search .............. 427/430.1, 180, 206, 427/389.9, 394; 428/96; 156/72

[56] References Cited

U.S. PATENT DOCUMENTS

| | | | |
|---|---|---|---|
| 4,059,465 | 11/1977 | Edgar et al. | 156/72 |
| 5,081,752 | 1/1992 | Reinhard et al. | 28/140 |
| 5,252,375 | 10/1993 | Turbak et al. | 428/96 |

FOREIGN PATENT DOCUMENTS

| | | |
|---|---|---|
| 388118 | 5/1989 | Austria . |
| 0264746 | 4/1988 | European Pat. Off. . |
| 0278690 | 8/1988 | European Pat. Off. . |
| 2357446 | 5/1974 | Germany . |
| 2533764 | 2/1977 | Germany . |
| 3229150 | 4/1984 | Germany . |
| 4327918 | 9/1993 | Germany . |
| 2057353 | 4/1981 | United Kingdom . |
| WO90/04063 | 4/1990 | WIPO . |

*Primary Examiner*—Shrive Beck
*Assistant Examiner*—David M. Maiorana

[57] ABSTRACT

For coating, a flat body is inserted into a mold having a base and side walls. The mold and the flat body are dipped into a coating material. After hardening of the coating material the flat body is removed from the mold and laterally trimmed.

8 Claims, 2 Drawing Sheets

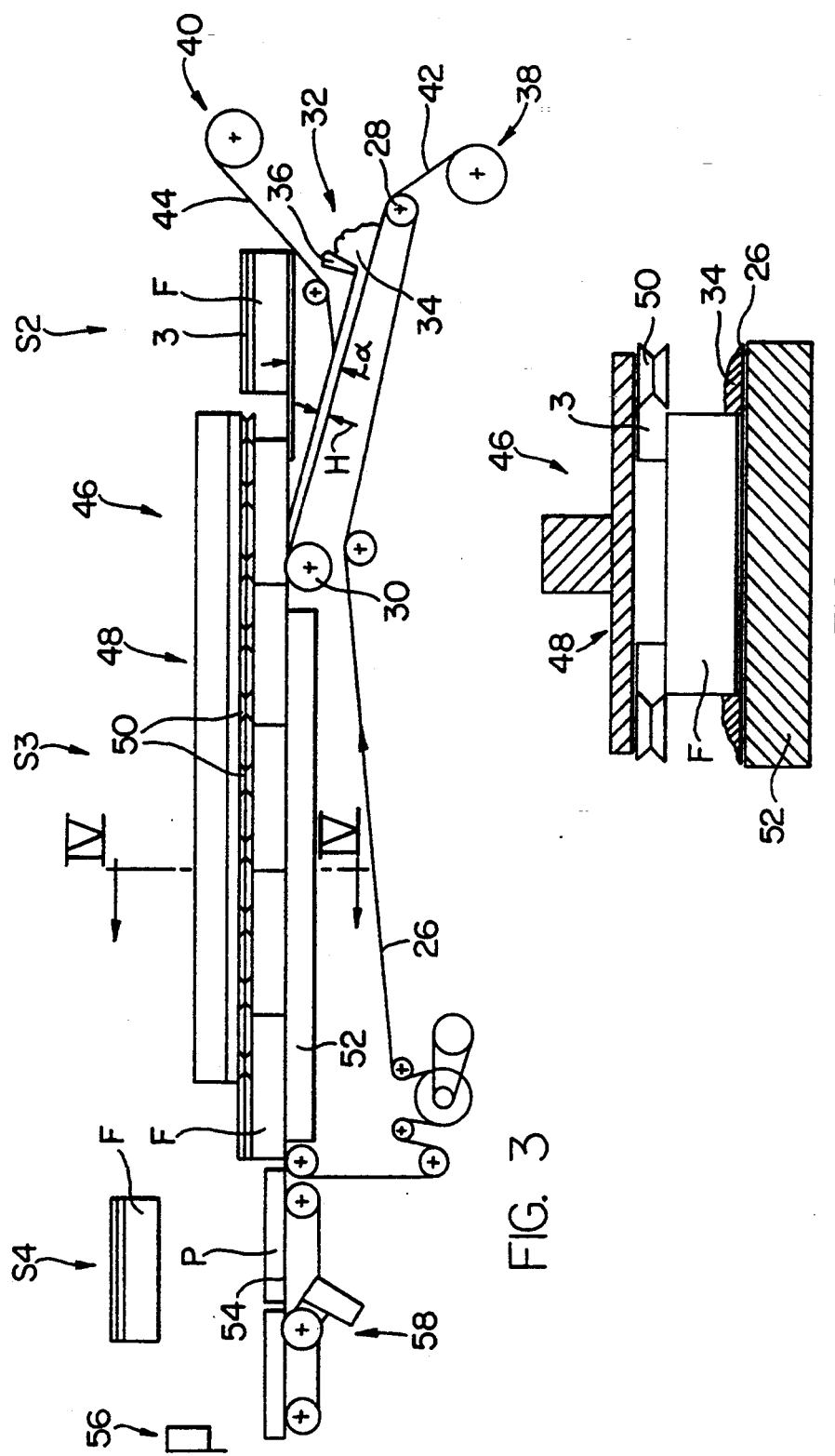

METHOD AND APPARATUS FOR COATING FLAT TEXTILE BODIES, ESPECIALLY CARPET PANELS

BACKGROUND OF THE INVENTION

The invention concerns a method and apparatus for the coating of textile flat bodies, especially carpet panels.

Carpet panels, often also called carpet tiles, are in accordance with the present state of the art manufactured by continuous processes. Endless woven or tufted goods from rolls are continuously coated with at least one layer of a coating material, for example PVC, and after solidification of the coating material the carpet so formed is stamped or cut into panels as explained for example in GB 2,057,353A and EP 0,278,690A or in Chapter 5.2 "Carpet Rear Coating" in Kunststoff-Handbuch No. 7, Carl Hahset Press, 1983. Because of the large width and length of the goods, the method requires very expensive apparatus as well as large running lengths of carpet material. To operate the method economically very large throughputs are required which greatly reduces flexibility. Moreover, through stamping of carpet panels by means of the window technique large amounts of waste occur.

SUMMARY OF THE INVENTION

The object of the invention is to provide an improved method and an improved apparatus for the coating of textile flat bodies, especially carpet panels.

The object is solved in accordance with the invention by a method for coating textile flat bodies such as carpet panels in which the flat bodies are arranged in a mold opening at the lower face, and with the aid of the mold the bodies are dipped into a coating material so that the material penetrates upwardly to a predetermined depth into the flat body. The apparatus for carrying out the method comprises a mold with a bottom and side walls for temporarily receiving at least one of the flat bodies. A coating station is provided for dipping the free side of the flat bodies into a coating material while they are held in the molds. A processing zone allows the applied coating material to solidify and then the coated flat bodies are removed from the molds at an unmolding or extraction station.

By the arrangement of the flat bodies in a mold open on one side easy access to one side of the flat bodies is made possible, which moreover essentially facilitates the application of the coating material. Thereby a rational coating of textile flat bodies, especially of carpet panels, in small numbers of pieces and of varying formats is made possible, no large machine of the previously known type being made necessary.

For the mechanical strengthening of the coating a reinforcing inlay is inserted into the coating material. A reinforcing inlay in the form of fiber or thread segments can be applied. A development in which the reinforcing inlay is applied in woven, unidirectional or nonwoven form is advantageous. The reinforcing inlay can be applied in the coating material after it has already been spread as a layer. Depending on circumstances, the reinforcing inlay in the form of fibers can be added to the coating material before it is spread.

The coating of the flat body can be improved by preheating flat bodies before coating so that the residual moisture content of the flat body can be removed. On the other hand, the preheating improves the penetration of the coating material into the flat body. In this connection it is advantageous if the base of the mold is provided with exhaust openings which, for example, facilitate the release of the moisture.

The flat bodies can be individually coated, but a method in which they are arranged in molds and continuously coated is advantageous.

The coated flat bodies after solidification of the coating material are separated from one another and/or are trimmed.

It is advantageous if the apparatus is equipped with a preheating station for the flat bodies.

A preferred mold has exhaust openings in the base which facilitate the evacuation of air from the filled molds.

An especially simple development of the apparatus includes a conveyor belt running through the coating station and the processing zone can then receive the layer of coating material into which the flat body is brought. Also advantageous is a further development of the apparatus where the coating material is provided with a strengthening insert before bringing the flat bodies into contact with the coating material. The insertion of the flat body arranged in the mold into the coating material on the conveyor belt can be facilitated by an arrangement of the apparatus in which the filled molds and the coating material meet one another at an acute angle between 5° and 20°.

For achieving a constant coating thickness for all flat bodies to be coated the design having a calibrating apparatus is of advantage. For separating the coated flat bodies and/or for trimming them, a design of the apparatus having stamping or cutting devices at the unmolding station is advantageous.

By means of the foregoing method and the foregoing apparatus flat textile bodies, and especially carpet panels, of different forms and constructions can be coated. Especially preferred, however, is the coating of carpet panels made of bands lying adjacent to one another, which bands at one longitudinal side have a woven or knitted portion and on the other side have weft thread portions forming the nap of the carpet panels. The woven or knitted portions of neighboring bands which serve to anchor the weft thread portions are bonded to one another by means of the coating material.

BRIEF DESCRIPTION OF THE DRAWINGS

Preferred embodiments of the subject invention are explained in greater detail hereinafter in connection with the drawings, which show:

FIG. 3 an apparatus for coating textile flat bodies in schematic representation; and FIG. 4 the apparatus of FIG. 3 in a section taken on line IV—IV of FIG. 3, at enlarged scale.

DESCRIPTION OF THE PREFERRED EMBODIMENTS

Figure 1:
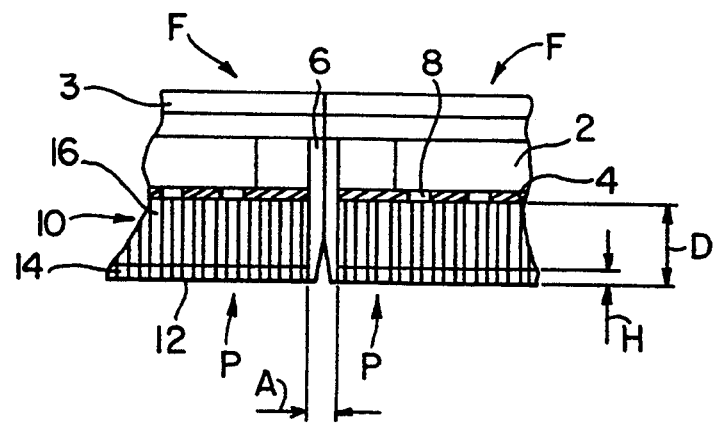
FIG. 1 two molds abutting one another and filled with textile flat bodies, in fragmentary form and in vertical section.

FIG. 1 shows two molds F, for receiving textile flat bodies P, with a base 4 strengthened by ribs 2, on which molds are arranged guide rails 3 of inverted V-shape cross section and side walls 6. The base 4 contains air exhaust openings 8 and on the side facing away from the base 4 the mold F is open. The flat body P comprises a packet or stack of bands 10, arranged so as to stand upright and parallel to one another, so that their longitudinal edges 12 facing away from the base 4 are free to be coated. The portion 14 of the bands 10 adjacent the longitudinal edges 12 is woven or knitted. Connected with the portion 14 are pile threads 16 extending upwardly, that is toward the base 4, which pile threads for example are formed by weft threads and form the nap of the carpet. The bands 10 are arranged in the mold F so as to be slightly compressed, so that they are held in flat, plane parallel condition. According to the thickness of the bands the packing density of the stacking can vary between two and ten bands per centimeter. The air exhaust openings 8 in the base 4 of the mold F facilitate the drying of the packets or flat bodies P formed by the bands 10. The side walls 6 are coated with Teflon and are beveled towards the open side of the mold F to facilitate penetration into the coating material and removal of the mold F. With molds F lying next to one another the packets P have a mutual spacing A.

Figure 2:
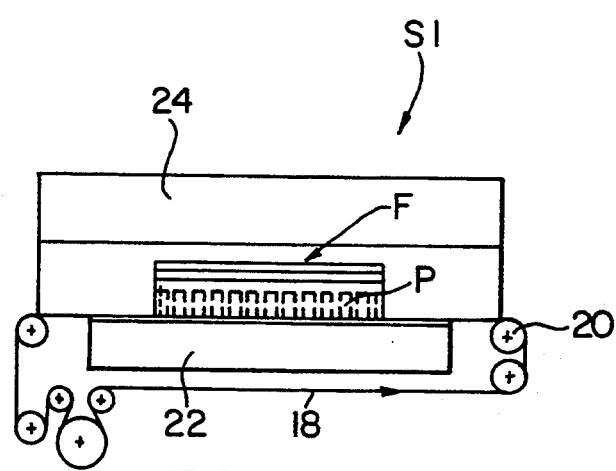
FIG. 2 a preheating station in schematic representation.

The mold F with the packet P made of bands 10 is conveyed by the apparatus illustrated in FIGS. 2 and 3, for which customary conveyor belts such as, for example, Teflon coated glass belts or steel belts or also support sheets of aluminum or stainless steel can be used. The molds F can be conveyed individually or directly abutting one another, as is shown in FIG. 1.

The mold F runs first through a preheating station S1, which, for example, can be formed in accordance with FIG. 2. In this case the mold F lies with the packet P on a conveyor belt 18, for example in the form of a gridded belt endlessly guided over various guide rolls 20. The mold travels through an infrared heater 22 and/or a hot air blower 24, so that on one hand the packet is heated and on the other hand is dried. In this way, a package consisting for example of wool can have its usual moisture content reduced from about five percent to a residual moisture content of about one percent. The side of the packet P at the longitudinal edges 12 of the bands 10 is heated to about 100° C. The packet in the mold F so pretreated is subsequently directly delivered to a coating station S2 according to FIG. 3.

The coating station S2 and a processing zone S3 connected therewith include a common conveyor belt 26 which in the coating station S2 is so guided over guide rolls 28, 30, that it is inclined relative to the processing zone S3 by an acute angle $\alpha$ of 5° to 20° preferably 10°. A feed apparatus 32 is arranged at this inclined section, which feed apparatus applies the coating material 34, for example by means of a coating knife 36, in a layer of constant thickness. Preferably the apparatus is adjusted to provide a layer thickness of between 2 mm and 4 mm. Before and/or after the feed apparatus 32 is a delivery apparatus 38, 40 for delivering reinforcing inlays 42, 44 into the coating material 34. These reinforcing inlays 42, 44, each of which for example can be a layed or woven scrims, are inserted into the liquid coating material and serve to mechanically strengthen the coating material 34 and to improve the dimensional stability of the finished body.

As evident from FIGS. 3 and 4, the mold F with the packet P is next brought to a calibrating apparatus 46. This calibrating apparatus has a carrier 48 on which are arranged guide rolls 50 with V-shaped running surfaces in cross sectional view and which cooperate with the inverted V-shaped rails 3, in cross sectional view, of the molds F. This calibrating apparatus 46 is adjustable, in a way not illustrated in greater detail, as to its spacing relative to the conveyor belt 26, so that the molds have an exactly defined spacing from the conveyor belt and so that thereby a definite thickness D of the packet is assured. The molds F with the aid of the calibrating apparatus 46 are driven into the coating material 34 at the guide roll 30 of the conveyor belt 26. The calibrating apparatus 46 extends also into the processing zone S3 to the point at which the coating material is solidified. In the processing zone S3 the mold travels through, for example, a plate heater 52, which affects the coating material 34 so as to solidify it. In the case of the coating material being made of a thermoplastic material, for example Hot-Melts, the plate heater 52 can be replaced by a cooling device, which solidifies the thermoplastic coating material by cooling it. The solidification can therefore be of very different types depending on the kind of coating material used, and can for example take place by means of a pure drying or gelling, or by cross linking or some other type of chemical reaction.

The length of the solidification path depends on the reactivity of the coating material, which is adjustable within wide limits, as well as to the kind of coating material. The use of a coating material made of a polyurethane base with high reactivity results, for example, in a polymerization time of one to three minutes at 90° C. With a speed of the conveyor belt 26 of five meters per minute a polymerization path length of from ten to fifteen meters is required. This speed, and therefore the length of the processing path, can be adapted to the production requirements.

Following the processing zone S3 is an unmolding or extraction station S4, to which the molds F are taken from the processing zone S3 by another conveyor belt 54. The molds F are now separated from the coated packets P and are returned for further use in the work procedure. The manipulating devices used for the removal of or lifting the molds F from the packets, for example robots or pneumatically actuated manipulating systems, are not illustrated in greater detail, as they belong to the state of the art. At least one stamping and/or cutting apparatus 56, operable transversely to the conveying direction, is provided at the unmolding station for separating from one another the individual packets which are still connected with one another by the remainder of the coating material and by the reinforcing inlays. Depending on circumstances, a portion of the flat body may also be cut off. Furthermore, stamping and/or cutting apparatus 58 operating parallel to the conveyor direction is provided to also laterally trim the packets. The stamping and/or cutting apparatuses 56,58 can be customary circular or band knives, stamping dies or the like.

The method and apparatus are especially preferred for the coating of a textile flat body comprising a packet of parallel bands as described in U.S. Pat. No. 5,081,152. These bands are constructed analogously to the bands 10 of FIG. 1 and have at least one woven or knitted longitudinal edge section, into which the free pile threads are bound. With the aid of the mold F a packet of such bands is coated, removed from the mold and trimmed. In the case of bands with two knitted longitudinal edges the packet is coated on both sides and after its removal from the mold and trimming it is separated along the middle plane between the coated sides to obtain two flat bodies, for example two carpet panels.

In accordance with the aforegoing method and the associated apparatus, textile flat bodies of different construction and of different dimensions can be manufactured according to need. Especially, carpet panels can be manufactured which vary in size and construction within wide limits. Preferred are carpet panels suited to an industrially common mosaic size, which in Europe is for example fifty by fifty centimeters or in the United States eighteen by eighteen inches, so that such carpet panels for example can have dimensions in length and width of, for example, fifty by one hundred cms., or fifty by fifty cms., or eighteen by eighteen inches. Since the coating material shrinks during solidification, it is necessary to use oversize molds F with, for example a surplus of one percent.

For the coating of carpet panels it is practical to use band sections of the type depicted in FIG. 1, which consist of natural or synthetic fibers especially suited for carpet goods, preferably wool, polyamides polypropylene and the like, or a mixture thereof, and which preferably but not necessarily lie in the fiber range of 2,000 to 6,000 dtex.

For use as the required coating material a number of different compositions are known. Such coating material can consist of natural or artificial latex, also meltable thermoplastic material, for example hot-melts of co-polyamides, EVA or materials based on soft polyvinylchloride or polyurethane. It is further known that such coating material can contain diverse filling materials and, additions, in order to adapt the coating material to the desired application. Such additions especially allow adjustment of the viscosity and of the reactivity so that the desired depth of penetration of the coating material into the packet is achieved. It also allows for adjustment of the weight per unit area of the carpet panels.

Especially preferred is a two component polyurethane coating material which in contrast to customary methods is not applied as a foam but in a compact, non-porous form. The coating material is preferably formulated as a heavy coating material; that is, loaded with mineral filling components of high specific weight, such as for example barium sulfate, so that a specific weight of the coating material of at least 1.2 g/cm$^3$, and preferably 1.5 g/cm$^3$, results.

The viscosity of the coating material is preferably so adjusted that it penetrates between the band sections to the desired depth. The viscosity value, measured on a Brookfield device at a temperature of 25° C. with a spindle H2 at five to ten revolutions per minute lies preferably between 1,000 and 10,000 mPas.

The height H of the coating material on the conveyor belt is regulated by adjusting the coating knife of the feed apparatus and in general has a value of between 2 mm and 4 mm. The penetration of the fiber material as well as the total weight of the flat body, or of the carpet panel, is regulated by the height of the coating layer.

The mechanical strengthening of the coating material can be provided directly by chopped fiber or threads and can be applied to the conveyor belt mixed with the coating material. Preferably, at least one layer of reinforcing threads or fibers in loose or fixed form, for example as layed or woven scrim or nonwoven materials layed in the liquid coating material. These reinforcing inlays bond intimately with the coating material and produce a stable composite with an elasticity of the finished carpet panels of less than 0.3% according to DIN 54 318. In general one layer of glass or polyester scrim with two threads per centimeter is sufficient, the thread thickness lying between 300 and 600 dtex. According to use application and quality requirements reinforcing inlays of higher or lower density can also be used, or different layed and woven scrim or nonwoven layers can be combined.

I claim:

1. A method of coating a textile flat body, comprising the steps of:

placing a packet of bands in a mold to form a flat body, the mold having an opening at one side and a base at the opposite side, the bands being arranged in the mold perpendicular to the base at the opposite side and having woven or knitted portions at the open side and free pile threads extending from the woven or knitted portions toward the base; and dipping the open side of the mold with the bands arranged therein into a coating material, the viscosity of the coating material being so adjusted that the material penetrates a limited depth into the flat body to join the bands together by means of the coating material at the woven or knitted portions.

2. A method according to claim 1, characterized in that at least one reinforcing inlay is inserted into the coating material during its liquid phase.

3. A method according to claim 2, characterized in that the reinforcing inlay is added in the form of cut fibers or threads.

4. A method according to claim 2, characterized in that the reinforcing inlay is applied in the form of a woven or layed scrims, nonwoven material, or individual threads.

5. A method according to claim 1, characterized in that the flat body is preheated before the dipping step.

6. A method according to claim 1, further characterized in that the base of the mold includes exhaust openings.

7. A method according to claims 1, characterized in that a plurality of flat bodies arranged in molds are continuously coated in succession.

8. A method according to claim 7, characterized in that the coating material solidifies, and after solidification of the coating material the flat bodies are separated from one another and/or are trimmed.

* * * * *